(12) United States Patent
Zu et al.

(10) Patent No.: US 11,815,357 B2
(45) Date of Patent: Nov. 14, 2023

(54) METHOD AND APPARATUS FOR INDOOR MAPPING, POSITIONING, OR NAVIGATION

(71) Applicant: Telefonaktiebolaget LM Ericsson (publ), Stockholm (SE)

(72) Inventors: Keke Zu, Solna (SE); Iana Siomina, Täby (SE); Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 426 days.

(21) Appl. No.: 16/322,353

(22) PCT Filed: Aug. 11, 2016

(86) PCT No.: PCT/SE2016/050747
§ 371 (c)(1),
(2) Date: Jan. 31, 2019

(87) PCT Pub. No.: WO2018/030925
PCT Pub. Date: Feb. 15, 2018

(65) Prior Publication Data
US 2019/0162542 A1 May 30, 2019

(51) Int. Cl.
*G01C 21/20* (2006.01)
*G06Q 30/02* (2023.01)
*G06Q 30/0251* (2023.01)

(52) U.S. Cl.
CPC ....... *G01C 21/206* (2013.01); *G06Q 30/0261* (2013.01)

(58) Field of Classification Search
None
See application file for complete search history.

(56) References Cited

U.S. PATENT DOCUMENTS

| 8,229,459 | B2 | 7/2012 | Wigren |
| 8,320,939 | B1 | 11/2012 | Vincent |

(Continued)

FOREIGN PATENT DOCUMENTS

| CN | 101162153 A | 4/2008 |
| CN | 102105809 A | 6/2011 |

(Continued)

OTHER PUBLICATIONS

Liu, H. et al., "Survey of Wireless Indoor Positioning Techniques and Systems", IEEE Transactions on Systems, Man, and Cibernetics—Part C: Applications and Reviews, vol. 37, No. 6, Nov. 1, 2007, pp. 1-14, IEEE.

(Continued)

*Primary Examiner* — Abdhesh K Jha
(74) *Attorney, Agent, or Firm* — COATS & BENNETT, PLLC

(57) ABSTRACT

A method (300) for indoor positioning or navigation comprises obtaining (310) a set of features which describe characteristics of a place in an indoor space. This obtained set of features may describe characteristics of a place at which a wireless device is located, a place targeted by a wireless device as a destination, or a place targeted by a wireless device to avoid. Regardless, the method (300) further comprises comparing (320) the obtained set of features to addresses of respective indoor blocks into which the indoor space is spatially divided. Each indoor block in this regard is identified as being located at an address formed from a set of features which describe characteristics of the indoor block. The method (300) also comprises determining (330), based on the comparing, which of the indoor blocks corresponds to the place in the indoor space.

15 Claims, 13 Drawing Sheets

(56) References Cited

U.S. PATENT DOCUMENTS

| | | | |
|---|---|---|---|
| 8,626,191 B2 * | 1/2014 | Siomina | G01S 5/0252 |
| | | | 455/410 |
| 8,804,574 B2 | 8/2014 | Siomina et al. | |
| 8,929,918 B2 | 1/2015 | Siomina et al. | |
| 9,361,889 B2 | 6/2016 | Chao et al. | |
| 10,859,382 B1 * | 12/2020 | Swidersky | G01C 21/206 |
| 2006/0129315 A1 * | 6/2006 | Kanematsu | G01C 21/3461 |
| | | | 340/995.1 |
| 2007/0050131 A1 * | 3/2007 | Masuda | G08G 1/096838 |
| | | | 701/533 |
| 2008/0062167 A1 * | 3/2008 | Boggs | G06T 19/00 |
| | | | 345/419 |
| 2008/0183378 A1 * | 7/2008 | Weidner | G01C 21/20 |
| | | | 701/533 |
| 2009/0248292 A1 * | 10/2009 | Adachi | G08G 1/096827 |
| | | | 701/533 |
| 2010/0008337 A1 | 1/2010 | Bajko | |
| 2011/0121963 A1 | 5/2011 | Prehofer | |
| 2012/0028654 A1 | 2/2012 | Gupta et al. | |
| 2014/0236475 A1 | 8/2014 | Venkatraman et al. | |
| 2015/0153180 A1 | 6/2015 | Ettinger et al. | |
| 2017/0089709 A1 * | 3/2017 | Marusco | G01C 21/206 |
| 2017/0115121 A1 * | 4/2017 | MacWilliams | G01C 21/206 |
| 2018/0308063 A1 * | 10/2018 | Jan | G07C 9/28 |

FOREIGN PATENT DOCUMENTS

| | | | |
|---|---|---|---|
| CN | 104956184 A | | 9/2015 |
| CN | 105136147 A | * | 12/2015 |
| CN | 105424031 A | | 3/2016 |
| WO | 2007043915 A1 | | 4/2007 |
| WO | 2007089182 A1 | | 8/2007 |
| WO | 2008054272 A1 | | 5/2008 |
| WO | 2013192022 A1 | | 12/2013 |
| WO | 2014194300 A1 | | 12/2014 |
| WO | 2017180033 A1 | | 10/2017 |

OTHER PUBLICATIONS

Presutti, L et al., "Qualxomm IZat Location Services Technology", Sep. 14, 2015, pp. 1-16, Qualcomm Technologies, Inc.

Faragher, R. et al., An Analysis of the Accuracy of Bluetooth Low Energy for Indoor Positioning Applications, Conference paper, ION GNSS+ 2014, Tampa, Florida, Sep. 1, 2014, pp. 200-210.

Wikipedia, "iBeacon", online article, Mar. 19, 2016, pp. 1-8, obtained from internet: https://en.wikipedia.org/wiki/IBeacon.

Rantala, J. et al., "High Accuracy Indoor Positioning—Technology Solution and Business Implications", Presentation for 3rd Invitational Workshop on Opportunistic RF Localization for Next Generation Wireless Devices, Nokia researcher center, May 7, 2012, pp. 1-10.

Google Maps, "Inside with Indoor Maps", online article, Apr. 29, 2016, pp. 1-7, obtained from internet: https://www.google.com/maps/about/partners/indoormaps/.

Nextnav, "Revised SID: Study on Indoor Positioning Enhancements for UTRA and LTE", 3GPP TSG RAN Meeting #65, Edinburgh, Scotland, Sep. 9, 2014, pp. 1-7, RP-141102, 3GPP.

Wigren, T. et al., "Adaptive Enhanced Cell-ID Fingerprinting Localization by Clustering of Precise Position Measurements", IEE Transactions on Vehicular Technology, vol. 56, No. 5, Sep. 1, 2007, pp. 3199-3209.

* cited by examiner

| $IB_1$ | $F_1(U_{IB_1}, V_{IB_1}, W_{IB_1})$ | $F_2(U_{IB_1}, V_{IB_1}, W_{IB_1})$ | ... | $F_m(U_{IB_1}, V_{IB_1}, W_{IB_1})$ | ... | $F_N(U_{IB_1}, V_{IB_1}, W_{IB_1})$ |
|---|---|---|---|---|---|---|
| $IB_2$ | $F_1(U_{IB_2}, V_{IB_2}, W_{IB_2})$ | $F_2(U_{IB_2}, V_{IB_2}, W_{IB_2})$ | ... | $F_m(U_{IB_2}, V_{IB_2}, W_{IB_2})$ | ... | $F_N(U_{IB_2}, V_{IB_2}, W_{IB_2})$ |
| ... | ... | ... | ... | ... | ... | ... |
| $IB_j$ | $F_1(U_{IB_j}, V_{IB_j}, W_{IB_j})$ | $F_2(U_{IB_j}, V_{IB_j}, W_{IB_j})$ | ... | $F_m(U_{IB_j}, V_{IB_j}, W_{IB_j})$ | ... | $F_N(U_{IB_j}, V_{IB_j}, W_{IB_j})$ |
| ... | ... | ... | ... | ... | ... | ... |
| $IB_K$ | $F_1(U_{IB_K}, V_{IB_K}, W_{IB_K})$ | $F_2(U_{IB_K}, V_{IB_K}, W_{IB_K})$ | ... | $F_m(U_{IB_K}, V_{IB_K}, W_{IB_K})$ | ... | $F_N(U_{IB_K}, V_{IB_K}, W_{IB_K})$ |

*FIGURE 4*

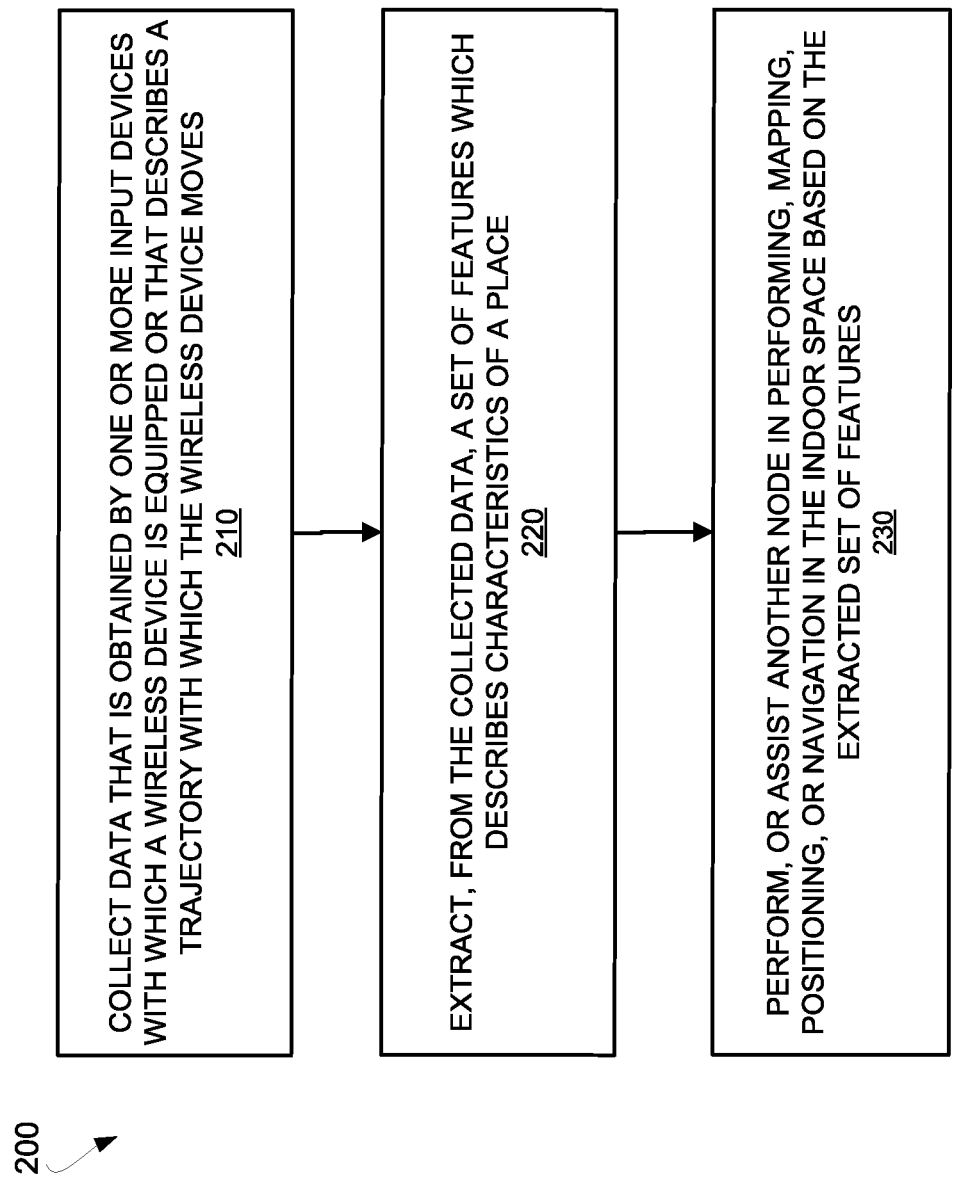

METHOD AND APPARATUS FOR INDOOR MAPPING, POSITIONING, OR NAVIGATION

TECHNICAL FIELD

The present application relates generally to positioning or navigation, and particularly to positioning or navigation in an indoor space.

BACKGROUND

Outdoor places are conventionally identified as being located at a so-called civic address. A civic address is the official number and name (e.g., street name) that is assigned to a property, building, or structure for identification and/or emergency dispatch purposes. It is a unique identifier for location purposes. A civic address may be formed, for example, as "123 Main Street". Positioning or navigation in an outdoor environment often revolves around civic addresses, especially since outdoor objects are usually large enough to be distinguished from each other.

Positioning or navigation in an indoor environment proves challenging in part because civic addresses are not as readily usable indoors. For example, the division of indoor spaces into a massive number of places such as rooms, hallways, exits, stairs, and the like makes it difficult to simply allocate civic addresses (e.g., room numbers). Moreover, some indoor places constitute open spaces (e.g., reception areas, coffee bars, kitchens), making the allocation of civic addresses to those open spaces challenging. Inherent shortcomings of civic addresses therefore complicate indoor positioning and navigation.

SUMMARY

One or more embodiments herein identify an indoor block in an indoor space as being located at an address formed from a set of features which describe characteristics of that indoor block. Features in the set may be stable features (e.g., describing an indoor block's visual or functional characteristics), statistical features (e.g., describing an indoor block's statistical user occupancy or statistical operating times), and/or dynamic features (e.g., describing an indoor block's current user occupancy). Regardless, this set of features effectively serves as a so-called "feature address" of the indoor block. In fact, in some embodiments, indoor blocks are identified as being located at their respective feature addresses, rather than any civic addresses thereof. With indoor blocks distinguished by their respective feature addresses, one or more embodiments exploit those feature addresses in performing indoor mapping, positioning, and/or navigation.

More particularly, embodiments herein include a method comprising determining multiple indoor blocks into which an indoor space is spatially divided. The method also comprises, for each of the indoor blocks, obtaining a set of features which describe characteristics of the indoor block and identifying the indoor block as being located at an address formed from the set of features.

In some embodiments, the method further comprises generating a map with the indoor blocks distinguished by the formed addresses. In this case, the generation may entail, for each of one or more indoor blocks, labeling the indoor block as displayed on the map with one or more features from the address formed for that indoor block.

Alternatively or additionally, obtaining the set of features may include extracting the set of features from data collected by or describing movement of user equipment within the indoor space.

Embodiments herein also include a method for indoor positioning or navigation. The method comprises obtaining a set of features which describe characteristics of a place in an indoor space. The method further comprises comparing the obtained set of features to addresses of respective indoor blocks into which the indoor space is spatially divided, wherein each indoor block is identified as being located at an address formed from a set of features which describe characteristics of the indoor block. The method also comprises determining, based on the comparing, which of the indoor blocks corresponds to the place in the indoor space.

In some embodiments, the obtained set of features describes characteristics of a place at which a wireless device is. In this case, the method further comprises identifying the wireless device as being positioned at the determined indoor block.

In other embodiments, the obtained set of features describes characteristics of a place targeted by a wireless device as a destination. In this case, the method further comprises providing navigational directions to the wireless device on how to travel to said place.

In still other embodiments, the obtained set of features describes characteristics of a place targeted by a wireless device to avoid. In this case, the method further comprises providing navigational directions to the wireless device on how to travel to a desired indoor block using a route that avoids traversal of the determined indoor block.

Where the method provides navigational directions, such providing may entail determining the route to include, or exclude, one or more features whose values are within one or more specified constraints.

Embodiments herein also include a method for indoor mapping, positioning, or navigation. The method comprises collecting data that is obtained by one or more input devices with which a wireless device is equipped or that describes a trajectory with which the wireless device moves. The method further comprises extracting, from the collected data, a set of features which describes characteristics of a place at which the wireless device is located, at which the wireless device targets as a destination, or at which the wireless device targets to avoid. The method also comprises performing, or assisting another node in performing, mapping, positioning, or navigation in the indoor space based on the extracted set of features.

In some embodiments, this assisting another node comprises signaling the extracted set of features to said another node. Alternatively or additionally, such assisting comprises signaling positioning information for the wireless device, along with the extracted set of features, to said another node.

In any of the above embodiments, a set of features which describe characteristics of an indoor block or a place may include one or more statistical features which statistically describe characteristics of the indoor block or the place. In some embodiments, for example, the one or more statistical features include one or more of: statistical information describing times at which wireless devices enter and/or leave the indoor block or place; statistical information describing how often wireless devices visit the indoor block or place; statistical information describing for how long wireless devices visit the indoor block or place; statistical information describing how many wireless devices visit the indoor block or place; statistical information describing how many wireless devices visit the indoor block or place simultaneously; statistical information describing which locations in the indoor block or place wireless devices visit; statistical information describing speeds at which wireless devices move through the indoor block or place; and statistical information describing an electrical, environmental, or physical characteristic of the indoor block or place, as detected by sensors of wireless devices that visit the indoor block or place.

Alternatively or additionally, a set of features which describe characteristics of an indoor block or a place may include one or more dynamic features which describe characteristics of the indoor block or place in substantially real-time. In some embodiments, for example, the one or more dynamic features include one or more of: a dynamic feature which describes how many wireless devices are currently visiting the indoor block or place; a dynamic feature which describes times at which functionality of the indoor block or place is available; a dynamic feature which describes which locations in the indoor block or place wireless devices are visiting; a dynamic feature which describes speeds at which wireless devices are currently moving through the indoor block or place; a dynamic feature which describes an electrical, environmental, or physical characteristic of the indoor block or place, as detected by a sensor of a wireless device that is currently visiting the indoor block or place; and a dynamic feature which describes a location of a wireless device that is currently visiting the indoor block or place and whose user has a specific job-related role. Alternatively or additionally, the one or more dynamic features include one or more of: a dynamic feature which describes a promotion currently offered by a business located at the indoor block or place; and a dynamic feature which describes a product or service currently offered for sale at the indoor block or place.

In any of the above embodiments, a set of features which describe characteristics of an indoor block or a place may include one or more stable features which describe substantially static characteristics of the indoor block or place. In this case, one or more stable features may include one or more of: a stable feature which describes a name associated with the indoor block or place; a stable feature which describes a functional characteristic of the indoor block or place; a stable feature which describes a visual characteristic of the indoor block or place; a stable feature which describes a physical size of the indoor block or place; a stable feature which describes a spatial orientation of the indoor block or place; a stable feature which describes a physical location of furniture in the indoor block or place; and a stable feature which describes times at which functionality of the indoor block or place is available.

In any of the above embodiments, a set of features which describe characteristics of an indoor block or a place may include one or more features which describe functionality available at the indoor block or place.

Alternatively or additionally, a set of features which describe characteristics of an indoor block or a place may include one or more statistical features which statistically describe characteristics of the indoor block or the place, one or more dynamic features which describe substantially real-time characteristics of the indoor block or place, and one or more stable features which describe substantially static characteristics of the indoor block or place.

In some embodiments, one or more of the features in a set of features which describe characteristics of an indoor block or a place are extracted from one or more of: trajectory data describing a trajectory of one or more wireless devices moving through the indoor space; imaging data comprising a video or a sequence of pictures taken by one or more wireless devices moving through the indoor space or by an indoor monitoring system; a floor plan of the indoor space; and textual or voice input from one or more wireless devices.

Embodiments herein also include corresponding apparatus, computer programs, and carriers.

BRIEF DESCRIPTION OF THE DRAWINGS

FIG. 4 is a block diagram of a data structure for representing a feature set that includes statistical features according to one or more embodiments.

FIG. 6 is a logic flow diagram of a method for indoor mapping, positioning, or navigation according to one or more embodiments.

DETAILED DESCRIPTION

Figure 1:
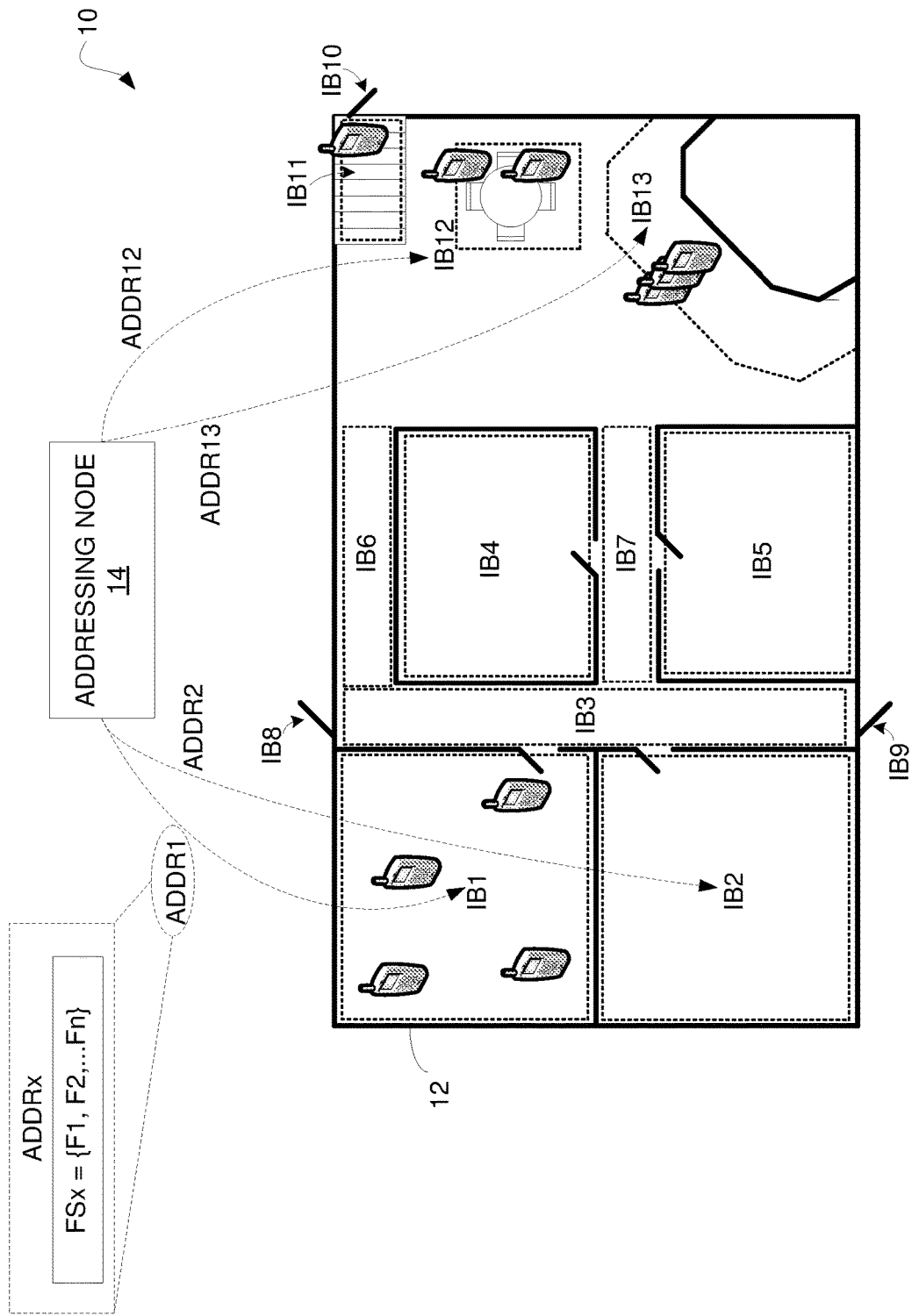
FIG. 1 is a block diagram of a system for addressing indoor blocks of an indoor space according to one or more embodiments.

FIG. 1 illustrates a system 10 for addressing different places in an indoor space 12, e.g., for use by the system 10 in performing mapping, positioning, or navigation. The system 10 in this regard addresses the different places using sets of features that describe characteristics of those places. In some embodiments, this equips the system 10 with the ability to efficiently address not only different rooms in the indoor space 12, but also other types of places in the indoor space 12. FIG. 1, for example, shows that the indoor space 12 includes different hallways, doors, stairs, and open spaces. The system 10 may address some or all of these different types of places using sets of features describing characteristics of those places.

More particularly, the system 10 includes an addressing node 14 configured to address the different places in the indoor space 12. To accomplish this, the addressing node 14 first determines multiple so-called indoor blocks (IBs) into which the indoor space 12 is spatially divided. FIG. 1 for example shows the indoor space as being spatially divided into indoor blocks IB1-IB13. Indoor blocks IB1, IB2, IB4, and IB5 correspond to different rooms in the indoor space 12, whereas indoor blocks IB3, IB6, and IB7 correspond to different hallways in the indoor space 12 and indoor blocks IB8, IB9, and IB10 correspond to different exterior doors of the indoor space 12. Similarly, indoor block IB11 corresponds to a stairway while indoor blocks IB12 and IB13 correspond to different open spaces (e.g., a table and a coffee bar).

In some embodiments, the addressing node 14 or another node in the system 10 (not shown) actually divides the indoor space 12 into indoor blocks using approaches described in International Application Number PCT/SE206/050318, which is incorporated by reference herein. For example, the indoor space 12 may be divided into indoor blocks that correspond to different clusters of wireless communication device locations. These device locations may be collected for instance based on movement of arbitrary wireless devices through the indoor space 12 in their normal routine (e.g., as the devices' users walk through stores or offices in the indoor space 12), rather than dedicated personnel moving through the space purely for mapping purposes. Boundaries (e.g., walls) and/or the limiting of certain functionality to a defined space (e.g., a coffee bar) contribute to the clustering of device locations, which are exploited to infer and define different indoor blocks in the indoor space 12.

No matter the particular node or approach used to actually divide the indoor space 12 into indoor blocks, the addressing node 14 in FIG. 1 addresses those indoor blocks. That is, the addressing node 14 assigns each indoor block an address. As shown, for instance, the addressing node 14 assigns IB1 an address ADDR1, assigns IB2 an address ADDR2, assigns IB12 an address ADDR12, assigns IB13 an address ADDR13, etc. Assigned such an address, an indoor block is identified as being located at that address. The indoor blocks are therefore generally distinguishable by their respective addresses.

Notably, the addressing node 14 addresses the indoor blocks using sets of features that respectively describe characteristics of those indoor blocks. In particular, the address of each indoor block is formed from a set of features that describe characteristics of that indoor block. As shown in FIG. 1, for instance, each address ADDRx for an indoor block IBx is formed from a feature set FSx. Each feature set FSx includes multiple features F1, F2, . . . Fn. Different features in the set FSx describe different characteristics of the indoor block IBx. In some embodiments, the address ADDRx for an indoor block IBx is the feature set FSx itself, such that the address ADDRx effectively constitutes the combination of features F1, F2, . . . Fn that describe that indoor block IBx. In other embodiments, the address ADDRx for an indoor block IBx is just derived from or otherwise depends on the feature set FSx in such a way that the feature set FSx provides a degree of distinction to the address, i.e., so that the addresses serve to distinguish the indoor blocks.

Figure 2:
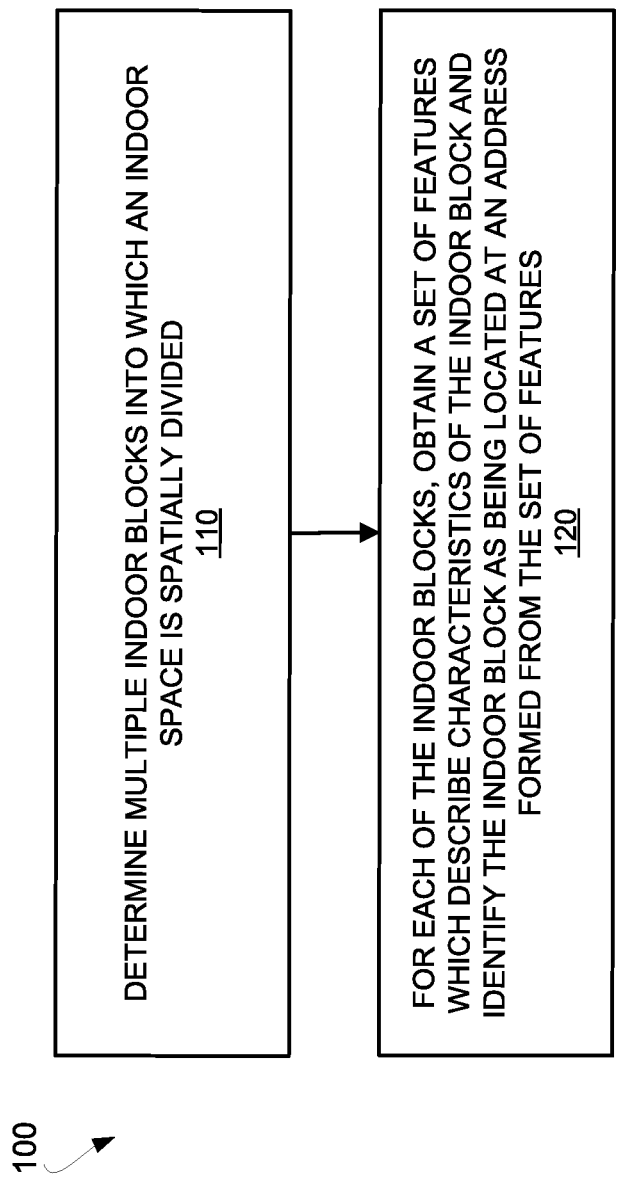
FIG. 2 is a logic flow diagram of a method for addressing indoor blocks of an indoor space according to one or more embodiments.

In general, then, the addressing node 14 performs a process 100 shown in FIG. 2 according to some embodiments. As shown, the process 100 includes determining multiple indoor blocks into which an indoor space 12 is spatially divided (Block 110). The process 100 further includes, for each of the indoor blocks, obtaining a set of features which describe characteristics of the indoor block and identifying the indoor block as being located at an address formed from the set of features (Block 120).

An address formed in this way from a feature set is appropriately referred to herein as a feature address. A feature address therefore differs from a conventional civic address in that a feature address actually describes characteristics of an indoor block, rather than simply being a construct (e.g., a room number) formed only as an otherwise meaningless label to distinguish one place from another without regard to the place's underlying characteristics. In fact, in some embodiments, an indoor block is identified exclusively in the system 10 by its feature address, i.e., the indoor block is not assigned a civic address in the system 10, as a feature address replaces such a civic address. This proves advantageous for instance for addressing types of indoor blocks that do not traditionally have a civic address, such as open areas (e.g., reception areas, coffee areas).

Figure 3:
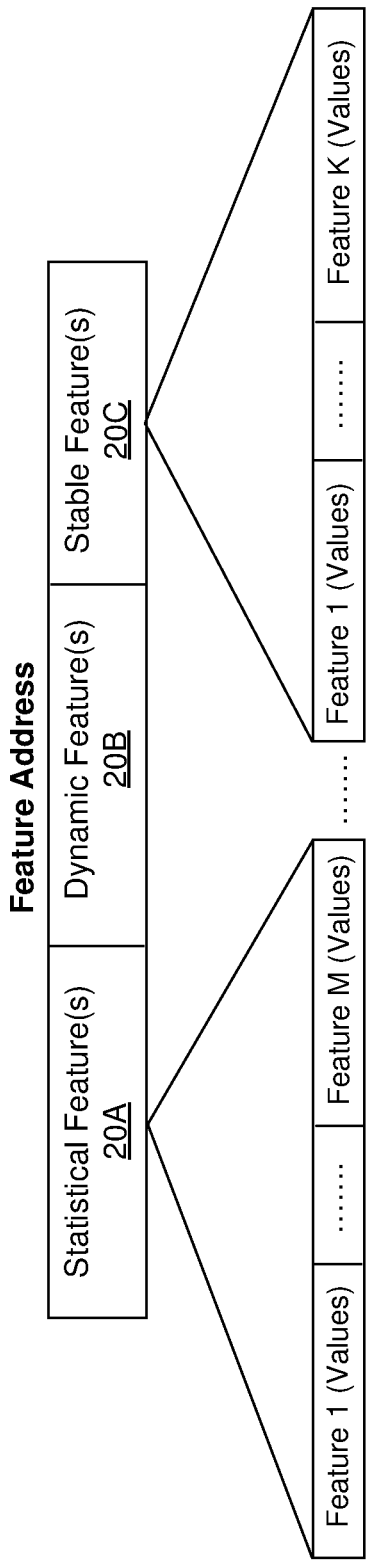
FIGS. 3A-3B are block diagrams of data structures for representing a feature address according to one or more embodiments.

The feature set from which a feature address is formed may include any type of features which describe characteristics of an indoor block. These features may be for example stable features, statistical features, dynamic features, or any combination thereof. FIG. 3A in this regard illustrates one example of a data structure for a feature address which comprises a combination of stable features 20A, statistical features 20B, and dynamic features 20C. Each feature, whether stable, statistical, or dynamic in nature, may describe a characteristic of an indoor block in terms of one or more values. FIG. 3B for instance shows a feature address formed for an indoor block $IB_j$ from M statistical features, J dynamic features, and K stable features. The quantity $F_{Stas_m}$ is the m-th statistical feature with values $(U_{IB_j}, V_{IB_j}, W_{IB_j})$, $F_{D_j}$ is the j-th dynamic feature with values $(X_{IB_j}, Y_{IB_j}, Z_{IB_j})$ and $F_{Stab_k}$ is the k-th stable feature with values $(A_{IB_j}, B_{IB_j}, C_{IB_j})$.

More particularly, a stable feature describes a substantially static characteristic of an indoor block, i.e., a characteristic that generally remains static over time. A name associated with the indoor block (e.g., McDonalds, GameStop, etc.) may be one such stable feature. Another example of a stable feature may describe a functional characteristic of the indoor block. A functional characteristic may indicate a type of the indoor block in terms of function (e.g., retail store, office, restaurant, bathroom, staircase, etc.). As yet another example, a stable feature may describe a visual characteristic of the indoor block, such as the indoor block's color(s) or shape. Another stable feature may describe a physical size of the indoor block, e.g., in terms of the indoor block's specific quantitative dimensions or in terms of qualitative descriptors of those dimensions (e.g., "small" or "big"). As still another example, a stable feature may describe a spatial orientation of the indoor block, which may be specified relative to the indoor space 12 (e.g., "the indoor block is located at the north end of the indoor space"). In still other examples, a stable feature may describe a physical location of furniture in the indoor block (e.g., the position of a table). In some cases, a stable feature may describe times at which functionality of the indoor block is available. These times may therefore reflect opening and closing times of the indoor block (e.g., a restaurant or store), as those times are generically defined (e.g., without regard to exceptions such as holidays or special circumstances).

A statistical feature by contrast statistically describes characteristics of an indoor block, e.g., in terms of average, mean, median, standard deviation, minimum, maximum, percentile, a histogram, or other statistical information. In some embodiments, this statistical information is generated based on information collected from arbitrary wireless devices as their users move through the indoor space 12 in their normal routine (e.g., as the users walk through stores or offices in the indoor space 12). As described more fully below, such information may include for instance positioning information, trajectory data, imagining data, etc.

In any event, a statistical feature may include for instance statistical information describing times at which wireless devices enter and/or leave the indoor block. Such a feature may for example describe at what time devices typically first enter the indoor block over a certain time period, e.g., when users typically first enter the indoor block on any given day so as to reflect for instance when a store typically gets its first customer for the day, or when users typically first enter the indoor block after noon. Alternatively or additionally, a feature may describe at what time devices typically last leave the indoor block over a certain time period, e.g., when users typically last leave the indoor block on any given day so as to reflect for instance when a store typically has its last customer for the day.

As another example, a statistical feature may include statistical information describing how often wireless devices visit an indoor block. The information may for example reflect the frequency at which any devices occupy the indoor block, e.g., so as to characterize how often the indoor block is occupied by devices versus empty without devices. As still another example, a statistical feature may include statistical information describing for how long wireless devices visit an indoor block. The information may for example characterize the typical duration for which any given device occupies the indoor block (e.g., so as to reflect the typical length of a haircut appointment, where the indoor block corresponds to a barber shop or salon). As yet another example, a statistical feature may include statistical information describing how many wireless devices visit an indoor block. This information may for example characterize the total number of wireless devices that typically occupy the indoor block over the span of a defined time duration (e.g., per day, or per certain hours during the day). As a related example, another statistical feature may include statistical information describing how many wireless devices visit an indoor block simultaneously. That is, the information may characterize the total number of wireless devices that typically occupy the indoor block at the same time, e.g., over the span of a defined time duration. The feature may thereby reflect how crowded an indoor block is typically during certain times (e.g., how crowded the indoor block is during certain hours of a day).

In still other examples, a statistical feature may include statistical information describing which locations in an indoor block wireless devices visit. As another example, a statistical feature may include statistical information describing speeds at which wireless devices move through an indoor block. These and other statistical features may for example describe certain indoor blocks that offer quick exits from the indoor space 12, e.g., during an emergency.

As yet another example, a statistical feature may include statistical information describing an electrical, environmental, or physical characteristic of an indoor block, as detected by sensors of wireless devices that visit the indoor block. Such a characteristic may for instance concern electromagnetic radiation, barometric pressure, temperature, humidity, WiFi signal strength, or the like.

No matter the particular statistical features used, those features in some sense reflect a statistical definition for each indoor block. Because the indoor blocks typically differ not only in terms of spatial location but also in terms of function and purpose, the statistical features for different indoor blocks are likely to characterize those indoor blocks in different ways. Because of this, the statistical features readily distinguish indoor blocks from one another.

Note that the statistical information for any given statistical feature may describe an indoor block using one or more statistical metrics. For example, in some embodiments, the statistical information for a given statistical feature describes an indoor block in terms of average, mean, and standard deviation. FIG. 4 in this regard illustrates an example of a data structure maintained by the addressing node 14 for statistical features which describe an indoor block in this way.

As shown in FIG. 4, the data structure stores N statistical features $F_1, F_2, \ldots F_N$ for each of K indoor blocks $IB_1 \ldots IB_K$. Each of these statistical features includes statistical information describing an indoor block in terms of 3 statistical metrics; namely, an average U, a mean V, and a standard deviation W. For example, a statistical feature $F_1$ describes a characteristic of an indoor block $IB_1$ in terms of an average $U_{IB1}$, a mean $V_{IB1}$, and a standard deviation $W_{IB1}$ of that characteristic. The values of these statistical metrics $U_{IB1}$, $V_{IB1}$, and $W_{IB1}$ for indoor block $IB_1$ are likely to differ from the values of those same metrics $U_{IB2}$, $V_{IB2}$, $V_{IB2}$ for indoor block $IB_2$ due to the indoor blocks differing in terms of the statistical feature $F_1$. In this way, the set of statistical features $F_1, F_2, \ldots F_N$ along any given row in FIG. 4 in whole or in part serve as a feature address of an indoor block.

As alluded to above, though, the set of features may alternatively or additionally include one or more dynamic features. A dynamic feature describes a characteristic of an indoor block in substantially real-time. That is, a dynamic feature describes a characteristic of an indoor block as that characteristic changes over time. A dynamic feature may therefore be tagged or otherwise associated with a timestamp indicating a time or time interval during which the dynamic feature is valid as representing a characteristic of an indoor block. For example, a dynamic feature may describe how many wireless devices are currently visiting an indoor block. Such a feature may thereby reflect how crowded the indoor block is currently. As another example, a dynamic feature may describe times at which functionality of the indoor block is available. These times may be determined for instance based on whether any devices are actually visiting the indoor block. As still another example, a dynamic feature may describe which locations in the indoor block wireless devices are visiting. The feature may thereby reflect where in the indoor block any wireless devices are located. Alternatively or additionally, a dynamic feature may describe a location of a specific device that is currently visiting the indoor block. This specific device may be for instance the device of a user who has a specific job-related role (e.g., a manager of a store, a manager of a building, an assistant, a help desk technician, a receptionist, etc.). In another example, a dynamic feature may describe speeds at which wireless devices are currently moving through the indoor block. As yet another example, a dynamic feature may describe an electrical, environmental, or physical characteristic of an indoor block, as detected by a sensor of a wireless device that is currently visiting the indoor block or place. Such a characteristic may for instance concern electromagnetic radiation, barometric pressure, temperature, humidity, WiFi signal strength, or the like.

Although the above examples of dynamic features largely characterize an indoor block from the perspective of wireless devices that traverse that indoor block, such need not be the case. In fact, in some embodiments, a dynamic feature may characterize an indoor block from the perspective of a business operated at that indoor block. For example, a dynamic feature may describe a promotion currently offered by a business located at an indoor block (e.g., a current discount, such as 20% off). As another example, a dynamic feature may describe a product or service currently offered for sale at an indoor block. In fact, in some embodiments, such a dynamic feature describes a product or service that has been newly offered for sale within a certain time frame (e.g., the past 3 days) so as to just indicate a newly available product or service. Because this sort of promotional information is effectively embedded within a feature address, it advantageously allows selective advertisement of that promotional information to only certain users likely to be interested; namely, those that actively search for a certain feature address, as described more fully below. This promotes more successful advertising as well as conserves transmission resources, as contrasted with approaches that broadcast promotional information to anyone and everyone in range.

No matter the particular characteristic indicated by this type of business-related dynamic feature, though, it may be populated in the system 10 by an owner or administrator of a business located at an indoor block. Alternatively or additionally, it may be populated in the system 10 by a wireless device user, e.g., via crowdsourcing of the business-related information.

In these and other embodiments, therefore, features herein may be extracted by the addressing node 14 or some other node (not shown) from any number of possible "raw" data sources. In some embodiments, for example, at least one feature is extracted from textual or voice input from one or more wireless device users. A user may for instance provide input indicating the name or visual characteristic of a particular indoor block. Alternatively or additionally, at least one feature may be extracted from imaging data (e.g., a video or a sequence of pictures) from one or more wireless devices moving through the indoor space 12 or from an indoor monitoring system (e.g., surveillance cameras). In still other embodiments, at least one feature is extracted (e.g., via analysis) from a floor plan of the indoor space 12. Such a floor plan may be obtained for instance from municipalities or through a multi-camera imaging tool (e.g., Google's Trekker) used to collect pictures of floor plans. Alternatively or additionally, at least one feature may be extracted from trajectory data describing a trajectory of one or more wireless devices moving through the indoor space 12. This trajectory data may be tracked by indoor positioning methods, such as those obtained using fingerprinting based adaptive enhanced cell-ID (AECID). See, e.g., PCT/SE2005/001485 and PCT/SE2006/050068, each of which is incorporated by reference herein.

Note also that feature extraction may also be based on inferences made from other features. For example, a stable feature describing functionality of an indoor block may be inferred from one or more statistical features extracted for that indoor block.

Figure 5A:
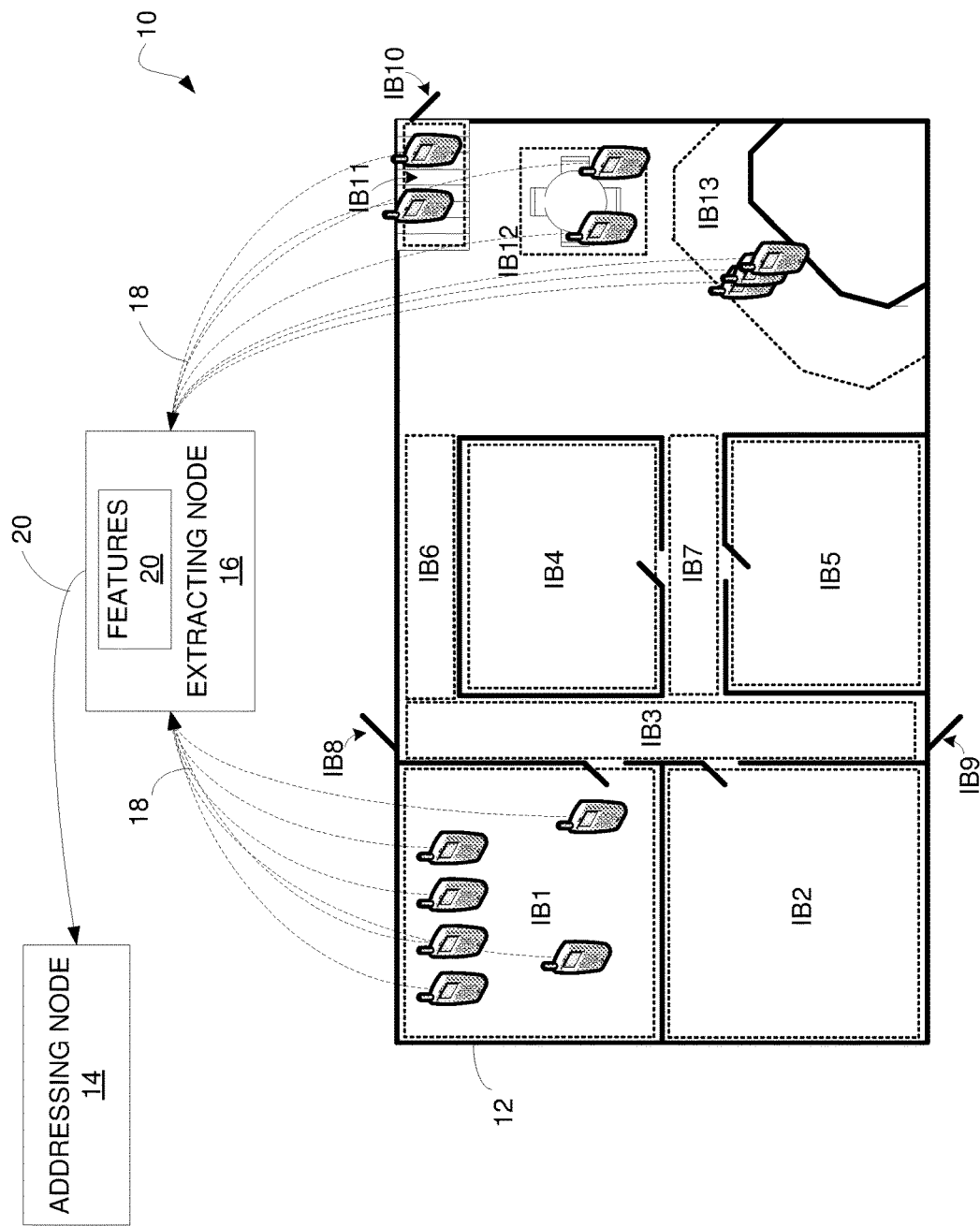
FIGS. 5A-5B are block diagrams of different embodiments for extracting features of indoor blocks and using those features for addressing indoor blocks according to one or more embodiments.
Figure 5B:
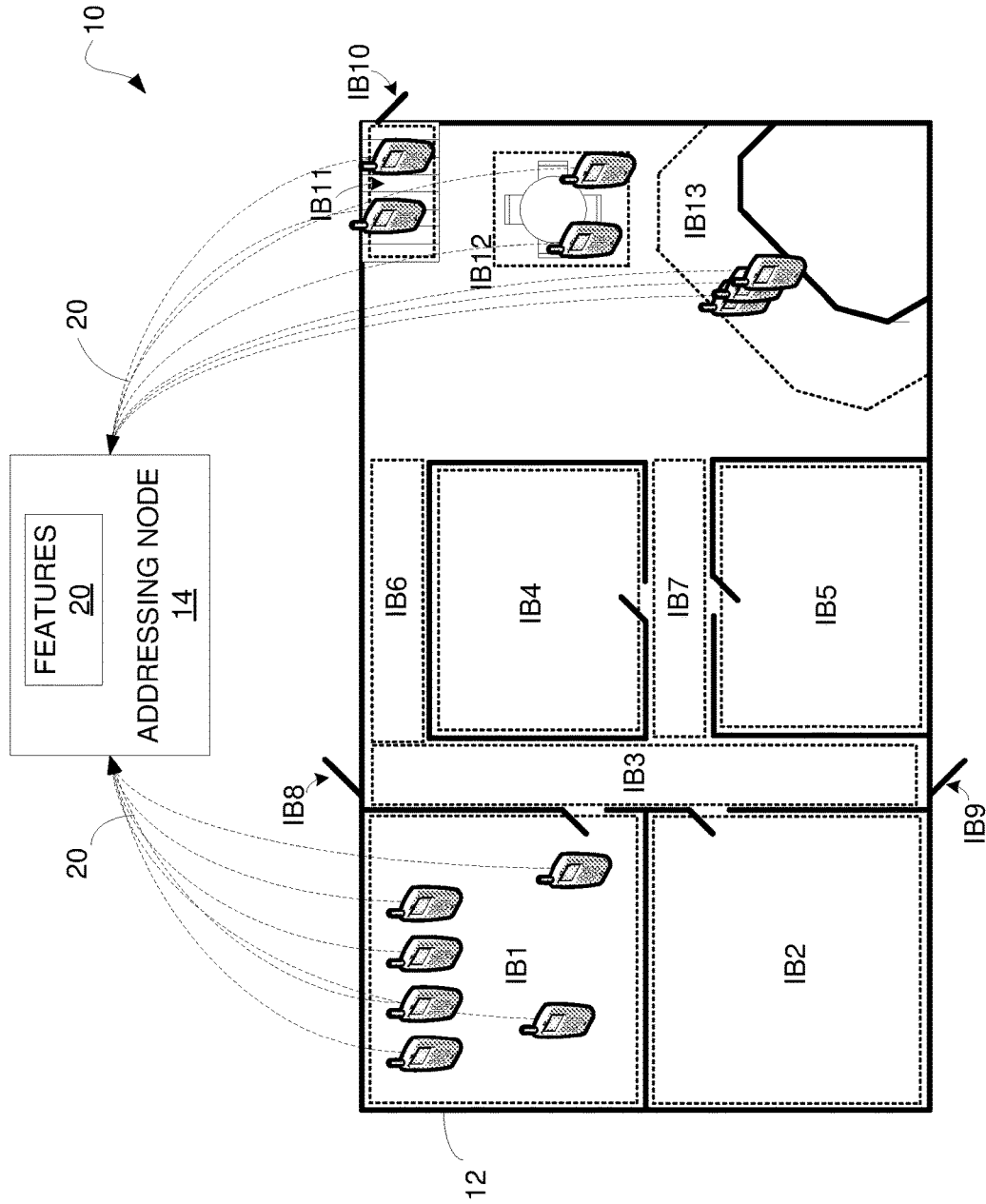

With these modifications and variations in mind, FIGS. 5A-5B illustrates different embodiments for extracting features for use by the addressing node 14 in addressing indoor blocks. As shown in FIG. 5A, an extracting node 16 collects certain "raw" data 18 from which it extracts features 20. This raw data may for example be obtained by one or more input devices with which a wireless device is equipped (e.g., a keyboard, a microphone, an imaging device, etc.). Alternatively or additionally, the raw data may describe a trajectory with which a wireless device moves in the indoor space 12, e.g., as determined by tracking device position. No matter the particular nature of the raw data 18, the extracting node 16 extracts features 20 from that data 18. Extraction may for instance entail processing the raw data 18 to detect or otherwise identify certain predefined features from the raw data 18. Extraction of statistical features, in particular, may involve evaluating raw data 18 from a certain period of time (e.g., the past 3 months). The extracting node 16 may perform this evaluation offline.

In any event, the extracting node 16 may then signal those features 20 to the addressing node 14 for use in addressing indoor blocks. In some embodiments, the extracting node 16 associates the features 20 with certain indoor blocks whose characteristics are described by those features 20, such that the extracting node 16 signals features 20 to the addressing node 14 along with information identifying the associated indoor blocks. In other embodiments, though, the extracting node 16 simply associates the features 20 with certain places in the indoor space 12, and the addressing node 14 or some other node determines which indoor blocks the signaled features 20 are associated with. In still other embodiments, the extracting node 16 and the addressing node 14 are the same node, such that no inter-node signaling is required (i.e., the same node both extracts features and addresses indoor blocks using those features). The extracting node 16 in some embodiments is a cloud radio access network (C-RAN) node.

FIG. 5B illustrates other embodiments where a wireless device itself serves as an extracting node 16. In these embodiments, therefore, a wireless device not only collects the raw data 18 but also extracts features 20 from that data 18. The device then signals the extracted features 20 to the addressing node 14, for use by the addressing node 14 in addressing indoor blocks using those features 20. In some embodiments, the device signals positioning information for the device along with the extracted features 20, where device positioning may be device initiated or network initiated. In this case, the addressing node 14 determines from the positioning information which indoor block the extracted features 20 are associated with. In other embodiments, the device signals information indicating the indoor block with which the extracted features 20 are associated.

No matter the particular approach, though, some embodiments effectively build up a database of feature sets for indoor blocks, based on raw data and/or features reported by wireless devices traversing the indoor space 12. This feature collection and/or reporting may be performed via a control and/or user plane. It may be transparent to radio base stations. In Long Term Evolution (LTE) embodiments, for example, the reporting may be performed via the LTE Positioning Protocol (LPP) and/or LPP extensions (LPPe). In another example, the reporting may be performed via radio network nodes, e.g., base stations or radio controllers. In one embodiment, for instance, feature reporting is performed from a user equipment to a radio network node which may then forward the reporting to a positioning node or store locally in the radio network node. The collection and/or reporting may be triggered by an event (e.g., upon event occurrence, the event may be reported or logged for later reporting) and/or a condition (e.g., at a certain time). Alternatively, collection and/or reporting may be performed upon a request from a network node, such as a positioning node. In still other embodiments, collection and/or reporting may be performed periodically.

In general, therefore, the extracting node 16 may be a wireless device (e.g., a user equipment), a radio network node (e.g., a base station), or a core network node in a wireless communication system. As one example, the extracting node 16 may be a positioning node, such as an evolved serving mobile location center (E-SMLC). Similarly, the addressing node 14 may be a radio network node or a core network node in a wireless communication system. The addressing node 14 may similarly be a positioning node such as an E-SMLC.

No matter the particular implementation for feature extraction or feature-based addressing, one or more embodiments exploit feature extraction and addressing herein for performing mapping, positioning, navigation, or other location-based purposes in the indoor space 12. In some embodiments, for example, the extracting node 16 performs, or assists another node in performing, mapping, positioning, or navigation in the indoor space 12 based on the set of features that it extracts. In this regard, FIG. 6 illustrates a process 200 performed by the extracting node 16. As shown, the process 200 includes collecting data that is obtained by one or more input devices with which a wireless device is equipped or that describes a trajectory with which the wireless device moves (Block 210). This data may for instance text or voice input by the wireless device user, imaging data captured by the device, trajectory data collected for the device, etc. Regardless, the process 200 further includes extracting, from the collected data, a set of features which describes characteristics of a place, e.g., associated with the device and/or its user (Block 220). This place may be for instance a place at which the wireless device is located, a place at which the wireless device targets as a destination, or a place at which the wireless device targets to avoid. The process 200 also includes performing, or assisting another node in performing, mapping, positioning, or navigation in the indoor space 12 based on the extracted set of features (Block 230). In some embodiments, for example, such assistance may entail signaling the extracted set of features to another node, e.g., the addressing node 14. In one embodiment, this signaling may accompany positioning information for the wireless device, e.g., so that a database of feature sets associated with certain positions can be built up.

Similarly, the addressing node 14 in some embodiments performs, or assists another node in performing, mapping, positioning, or navigation in the indoor space 12 based on its feature-based addressing of the indoor blocks.

Mapping may involve for instance generating a map with the indoor blocks distinguished by their respective feature addresses. In fact, for each of one or more indoor blocks, the indoor block may be displayed on the map with one or more features from its feature address denoted as a label. This label may appear directly on the map (when this service is turned on) or as background information (when this service is turned off).

Figure 7:
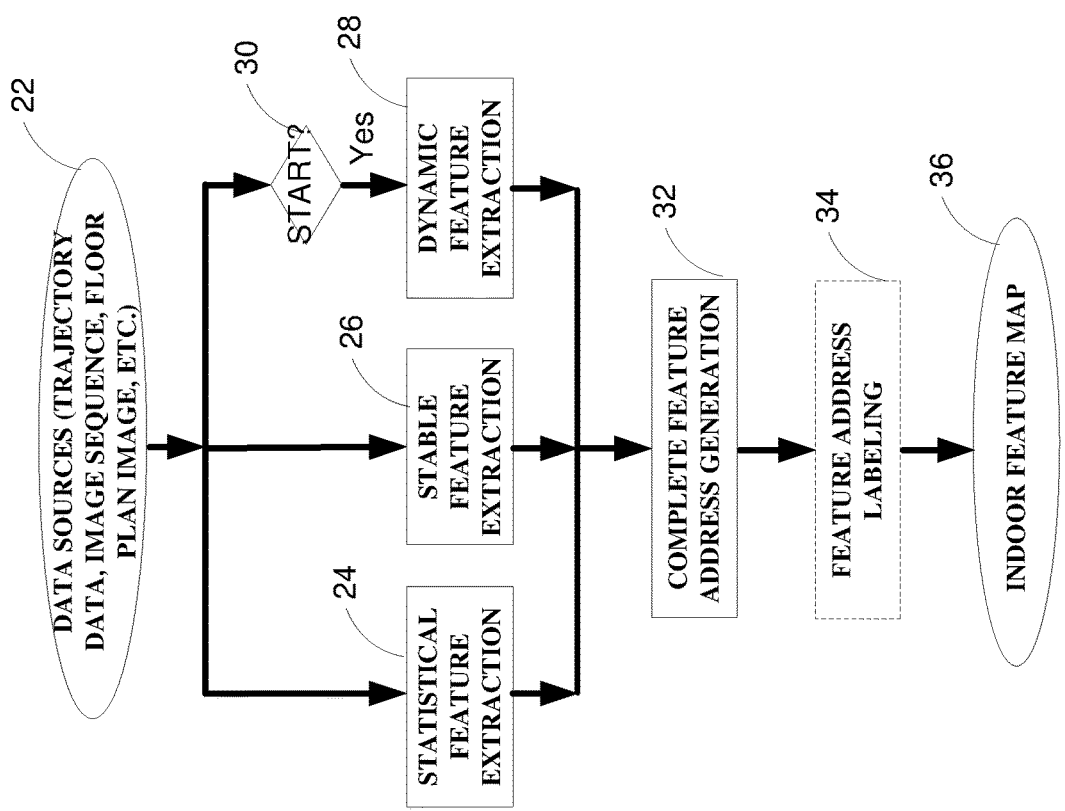
FIG. 7 is a logic flow diagram of a method for producing a machine-generated map according to one or more embodiments.

In any event, FIG. 7 illustrates one embodiment of a process performed by one or more nodes for generating such a map. As shown, the process includes obtaining data from one or more data sources 22, such as trajectory data, imaging data, floor plan images, or the like (Block 22). The process further includes, based on the obtained data, performing statistical feature extraction (Block 24), performing stable feature extraction (Block 26), and/or conditionally performing dynamic feature extraction (Block 28) at a certain time (Block 30). This extraction may be performed for instance by extraction node 16. In any event, with features extracted for respective indoor blocks, the process includes forming or otherwise generating complete feature addresses for those indoor blocks, e.g., by combining the features extracted for any given indoor block into a set and assigning that feature set as the indoor block's address (Block 32). Such may be performed by addressing node 14. In some embodiments, the process further includes labeling the indoor blocks with feature(s) from their respective feature addresses, e.g., so as to actually display some or all of those features on the map.

As a result of this process, a map of an indoor space 12 is generated with indoor blocks identified by respective feature addresses (Block 36).

With the map machine-generated, the map may then be displayed to a wireless device user, e.g., for manual positioning or navigation purpose. Alternatively, the map may be analyzed or otherwise used by a positioning or navigation node for such purposes.

Indoor positioning or navigation in this regard, with or without reference to a machine-generated map, may exploit feature-based addressing herein in order to determine the position of a certain place in the indoor space 12. In particular, indoor positioning or navigation may entail obtaining a feature set describing characteristics of a certain place in the indoor space 12 and then pinpointing a position of that place by identifying which of the indoor blocks has a feature address that best matches the obtained feature set. This approach advantageously enables positioning or navigation on a block-by-block basis, without reliance on conventional indoor positioning methods such as time of arrival (TOA), angle of arrival (AOA), received signal strength indication (RSSI), etc.

Figure 8:
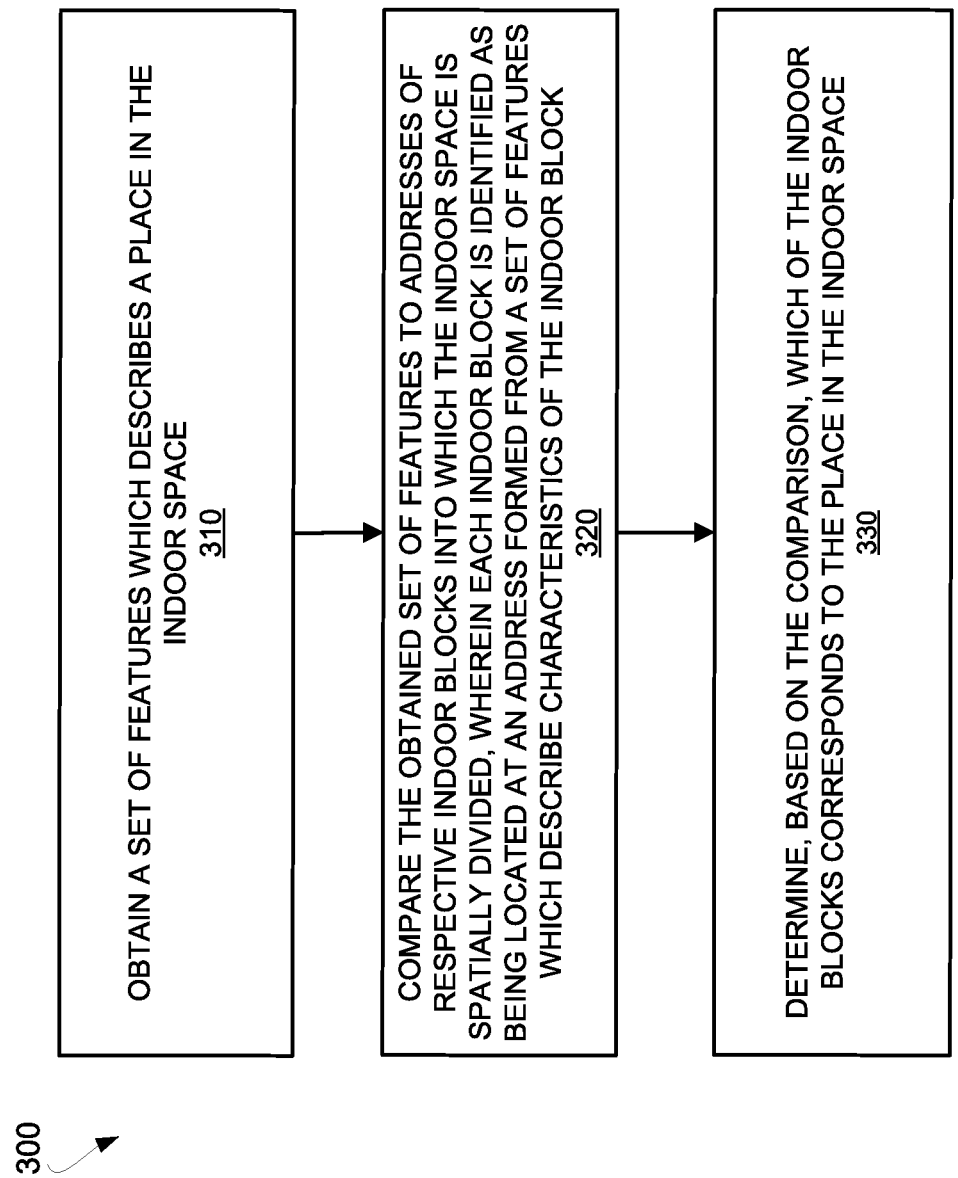
FIG. 8 is a logic flow diagram of a method for positioning or navigation according to one or more embodiments.

FIG. 8 illustrates one example process 300 for implementing indoor positioning or navigation according to these embodiments. As shown, the process 300 includes obtaining a set of features which describes characteristics of a place in the indoor space 12 (Block 310). This set of features may include statistical feature(s), dynamic feature(s), stable feature(s), or a combination thereof as described above. The process 300 then includes comparing the obtained set of features to addresses of respective indoor blocks into which the indoor space 12 is spatially divided (Block 320). As explained above, each indoor block in this regard is identified as being located at an address formed from a set of features which describes characteristics of the indoor block, i.e., its feature address. The process 300 further includes determining, based on the comparison, which of the indoor blocks corresponds to the place in the indoor space 12 (Block 330).

In some embodiments, for instance, this determination involves computing a matching metric quantifying the extent to which the obtained feature set matches each of the indoor blocks' feature addresses, and selecting the indoor block whose feature address matches the obtained feature set to the greatest extent according to the computed matching metrics. This matching metric may for instance quantify how many of the features in the obtained feature set match features in an indoor block's feature address exactly. Alternatively, a matching metric may quantify how many of the features in the obtained feature set match features in an indoor block's feature address within a predefined tolerance threshold. In this and other embodiments, therefore, a matching metric in a sense reflects a "distance" metric between the obtained feature set and an indoor block's feature address.

Exploiting feature-based addressing in this way may be used in some embodiments for device positioning, so as to determine the position of a place at which a wireless device is located in the indoor space 12. That is, the process 300 may be used to determine which of the indoor blocks corresponds to the wireless device's location in the indoor space 12. In this case, the process 300 may involve identifying the wireless device as being positioned in the determined indoor block.

The set of features describing the place at which the wireless device is located may be obtained in any number of ways. For example, the user of the device in some embodiments may input data into his or her wireless device that verbally or textually describes characteristics of the place at which the user is located, i.e., describing his or her surrounding environment. For instance, the user may input via the device's keyboard or microphone "I am in a computer game store where you can buy the new release of Need4Speed". In this case, features describing these characteristics are extracted from this data. These features may be for instance that the place the user is located is a store, and in particular a computer game store, and a new product for sale at the store is Need4Speed. As another example, the user may input "I am in a shoe shop near the north entrance of the shopping mall", from which the features "shoe shop" and "north entrance" may be extracted. In some embodiments, though, a validity check is performed, e.g., via a feedback loop, to verify user input. In some embodiments, for instance, a validity check is used to detect whether a user has really input effective information that can be used for feature extraction. For example, the validity check may detect whether voice, image, or video input by the user contains actual content, e.g., rather than silence or a "pocket" picture. Alternatively or additionally to user input, the wireless device itself may collect data from an input device such as video or photos from which are extracted features describing characteristics of the place at which the device is located. Such video or photos may be analyzed for instance to identify that the device is located in a computer game shop that sells the new release of Need4Speed. In this way, a user need simply verbally or textually describe characteristics of the place at which he or she is located in the indoor space 12, or allow his or her device to take imaging of that place, so that feature extraction and feature-based positioning can be performed on a block-by-block basis.

Note though that in at least some embodiments feature-based addressing may not be guaranteed to produce unique feature addresses for every indoor block. In this and other embodiments, therefore, a user interface of a user's wireless device may prompt for the user's selection from among multiple indoor blocks whose feature addresses each match the extracted set of features, e.g., within a defined matching threshold. For example, the user interface may display a map of the indoor space 12 and highlight indoor blocks with matching feature addresses. The map may also display other features of nearby indoor blocks, so as to provide the user with additional contextual information regarding his or her surroundings. This way, the user may confirm that he or she is located at one of the indoor blocks, such as by selection via touchscreen.

Alternatively or additionally, feature-based addressing may be used in some embodiments for navigation. For example, in some embodiments, the process 300 in FIG. 8 is used to determine the position of a place at which a wireless device targets as a destination, i.e., the user desires to go to that place. That is, the process 300 may be used to determine which of the indoor blocks corresponds to a place at which the wireless device targets as the destination of a navigable route. In this case, therefore, the process 300 may further entail providing navigational directions to the wireless device user on how to travel to that place.

The set of features describing the place at which the wireless device user desires to be may be obtained in any number of ways, similarly to those described above for device positioning. For example, the user in some embodiments may input data into his or her wireless device that verbally or textually describes characteristics of the place desired as a destination. For instance, the user may input via the device's keyboard or microphone "I want to find a bathroom that is empty". In this case, features describing these characteristics are extracted from this data. These features may be for instance that the place the user desires to be is a "bathroom" and that place is "empty". A feature set formed from these extracted features may be compared to the feature addresses of the indoor blocks, to determine which of the indoor blocks corresponds to the intended destination of an empty bathroom. Where the indoor blocks' feature addresses are formed from stable features indicating the type or functionality available at the indoor blocks (e.g., restaurant, store, bathroom) as well as dynamic features characterizing the indoor blocks' current occupancy, feature address matching yields the intended destination in a way that accounts for changing circumstances at the indoor blocks (e.g., occupancy). As another example of this, the user may input via the device's keyboard or microphone "I want to find a shoe shop that is having at least a 20% off sale" or "I want to find a barber shop that has haircut appointments that usually finish within 30 minutes". Embodiments herein leverage the dynamic features (e.g., promotional information) and/or statistical features (e.g., average occupancy time) that may form indoor block addresses, in order to find destination indoor blocks that user input such as this indicates as desired. As these examples illustrate, therefore, feature-based addressing enriches navigation by enabling (among other things) truly content-centric indoor navigation. Some embodiments for instance change indoor navigation from "where to go" (e.g., via room numbers) to "what to do or get" (i.e., user behavior), which is more natural and intuitive for users.

Note though that in at least some embodiments feature-based addressing may not be guaranteed to produce unique feature addresses for every indoor block. In this and other embodiments, therefore, a user interface of a user's wireless device may prompt for the user's selection from among multiple indoor blocks matching the user's desired destination criteria, e.g., within a defined matching threshold. For example, the user interface may display a map of the indoor space 12 and highlight indoor blocks that match the user's desired destination criteria. When the user confirms that one of the indoor blocks is the intended destination, such as by selection via touchscreen, the device navigates the user to the destination indoor block.

In some embodiments, the system 10 chooses the particular navigational route to the destination indoor block such that the route traverses, or does not traverse, certain intermediate places. For example, in one embodiment, the system 10 determines a set of features which describe characteristics of a place that is undesirable and therefore targeted for avoidance (e.g., a place that has a certain degree of crowding or waiting). The system 10 may determine this for example based on user input (e.g., voice or text) specifying an undesirable feature, based on a preconfigured setting or assumption about undesirable characteristics, or the like. In any event, the system 10 may then determine which of the indoor blocks corresponds to the undesirable place, based on a comparison of the determined set of features for that place and the indoor blocks' feature addresses. This way, the system 10 may determine and provide navigational directions to the wireless device on how to travel to a desired indoor block using a route that avoids traversal of the determined indoor block(s).

As another example of these embodiments, the undesired place may be a place susceptible to interference caused by the wireless device. For instance, an undesirable place for a medical robot to traverse may be an operating room which has sensitive medical devices that are susceptible to interference caused by the robot. In this case, the system 10 may determine navigational directions for the robot in such a way that the robot avoids passing an operating room.

The system 10 may alternatively choose the particular navigational route to the destination indoor block such that the route traverses a certain intermediate place, e.g., one that is desirable. That is, in one embodiment, the system 10 determines a set of features which describe characteristics of a place that is targeted as an intermediate destination (e.g., a coffee shop). The system 10 may determine this for example based on user input (e.g., voice or text) specifying a desirable feature. The system 10 may then determine which of the indoor blocks corresponds to the intermediate destination, based on a comparison of the determined set of features for that place and the indoor blocks' feature addresses. This way, the system 10 may determine and provide navigational directions to the wireless device on how to travel to a desired indoor block using a route that traverses the determined indoor block(s).

As a general matter, then, the system 10 may determine the navigational route to include, or exclude, one or more specific features. These one or more features may be specified by a device's user or otherwise delimited to include certain values that are within one or more respective constraints. For example, the route may require excluding any indoor block whose feature address has a feature describing a certain extent of crowding.

Note that feature extraction may be used for identifying a user's source indoor block, destination indoor block, undesired indoor block(s), or any combination thereof. For example, for any given navigational query, feature extraction may be used multiple times, once for identifying the user's source indoor block, once for identifying the user's destination indoor block, and/or once for identifying undesired destination blocks.

Note also that, in embodiments herein that leverage user input such as voice and text, that user input may be translated from one language to another as needed for feature extraction. User input may be translated for example from different languages to the local system default language. Regardless, language translation is performed according to teachings in U.S. Pat. No. 8,804,574, which is incorporated by reference herein.

In some embodiments, the techniques herein are implemented at least partly using a Long Term Evolution (LTE) positioning architecture. The three key network elements in an LTE positioning architecture are the Location Services (LCS) Client, the LCS target device (i.e., the UE), and the LCS Server. The LCS Server estimates the position of the LCS target device. Specifically, the LCS Server is a physical or logical entity that manages positioning for the LCS target device by collecting measurements and other location information, that assists the LCS target device in measurements when necessary, and that estimates the LCS target device's position. The LCS Client may or may not reside in the LCS target device itself. Regardless, the LCS Client is a software and/or hardware entity that interacts with the LCS Server for the purpose of obtaining location information for the LCS target device. Specifically, the LCS Client sends a request to the LCS Server to obtain location information. The LCS Server processes and serves the received requests, and then sends the positioning result and optionally a velocity estimate to the LCS Client. A positioning request can be originated from the LCS target device or the network.

Position calculation can be conducted, for example, by a UE or by a positioning server, such as an Evolved Serving Mobile Location Center (E-SMLC) or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between an LCS Server and an LCS target device, and is used in order to position the LCS target device. LPP can be used both in the user and control plane, and multiple LPP procedures are allowed in series and/or in parallel in order to reduce latency. LPPa is a protocol between an eNodeB and the LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobile Alliance (OMA) LPP extensions are being specified (LPPe) to allow e.g. for operator-specific assistance data, assistance data that cannot be provided with LPP, or to support other position reporting formats or new positioning methods.

Figure 9:
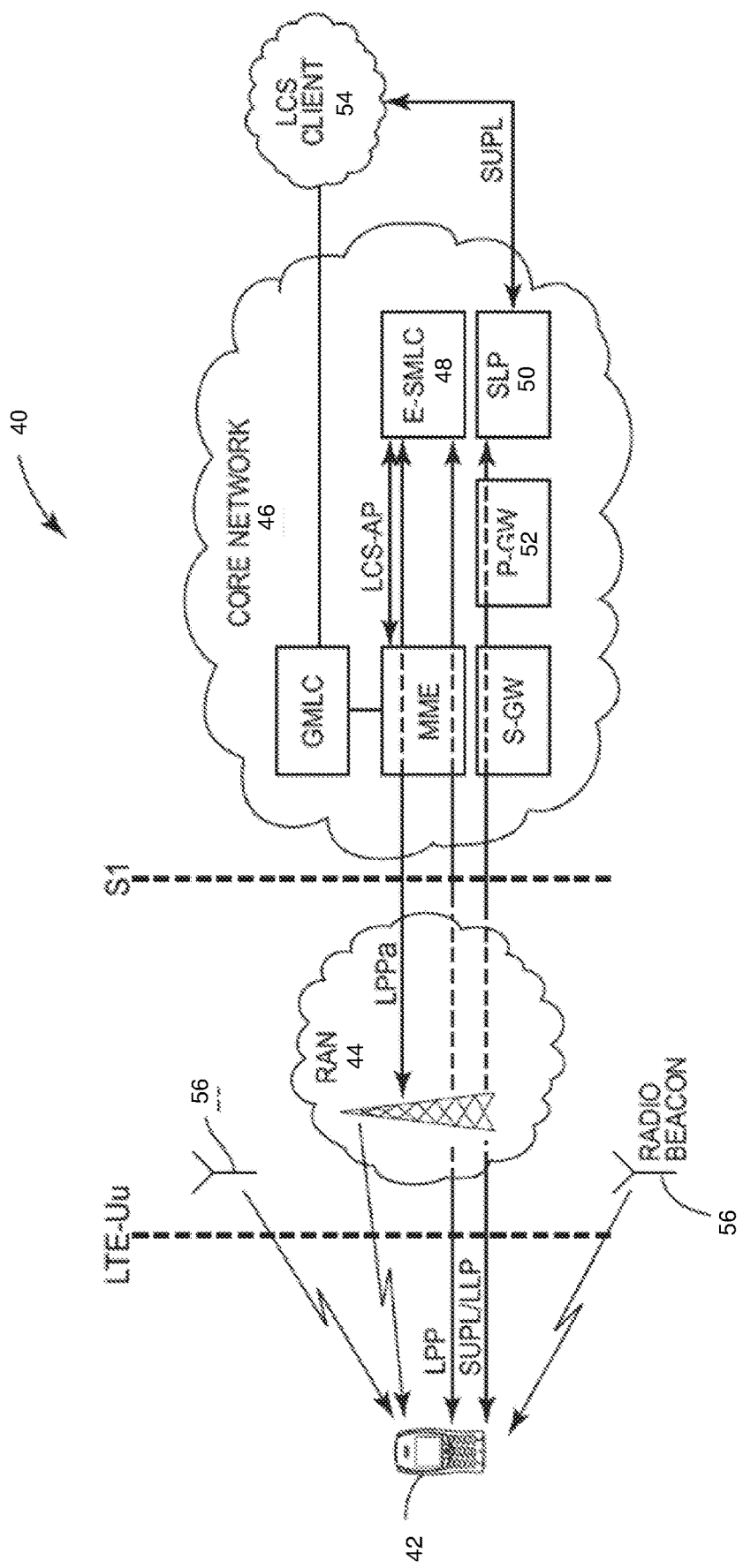
FIG. 9 is a block diagram of an LTE positioning architecture according to one or more embodiments.

A high-level architecture of such an LTE system 40 is illustrated in FIG. 9. In FIG. 9, the system 40 includes a UE 42, a radio access network (RAN) 44, and a core network 46. The UE 42 comprises the LCS target. The core network 46 includes an E-SMLC 48 and/or an SLP 50, either of which may comprise the LCS Server. The control plane positioning protocols with the E-SMLC 44 as the terminating point include LPP, LPPa, and LCS-AP. The user plane positioning protocols with the SLP 46 as the terminating point include SUPL/LPP and SUPL. Although note shown, the SLP 50 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 52 and an External LCS Client 54.

Additional positioning architecture elements may also be deployed to further enhance performance of specific positioning methods. For example, deploying radio beacons 56 is a cost-efficient solution which may significantly improve positioning performance indoors and also outdoors by allowing more accurate positioning, for example, with proximity location techniques.

Despite applicability to LTE-based networks, though, techniques herein may be applied to any wireless network. Thus, references herein to signals using terminology from the 3GPP standards for LTE should be understood to apply more generally to signals having similar characteristics and/or purposes, in other networks.

Techniques herein also apply to any type of wireless devices. In this regard, a radio node herein is any type of node (e.g., a base station or wireless communication device) capable of communicating with another node over radio signals. A radio network node is any type of radio node within a wireless communication network, such as a base station. A wireless communication device (or simply, wireless device) is any type of radio node capable of communicating with another radio node over radio signals. A wireless communication device may therefore refer to a user equipment (UE), a machine-to-machine (M2M) device, a machine-type communications (MTC) device, a narrowband internet of things (NB-IoT) device, etc. However it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

With the above modifications and variations in mind, an addressing node 14 as described above may perform the method 100 in FIG. 2 and any other processing herein by implementing any functional means or units. In one embodiment, for example, the addressing node 14 comprises respective circuits or circuitry configured to perform the steps shown in FIG. 2. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein. In some embodiments, for example, the addressing node 14 may be an Evolved Serving Mobile Location Center (E-SMLC) in a Long Term Evolution (LTE) system.

Figure 10:
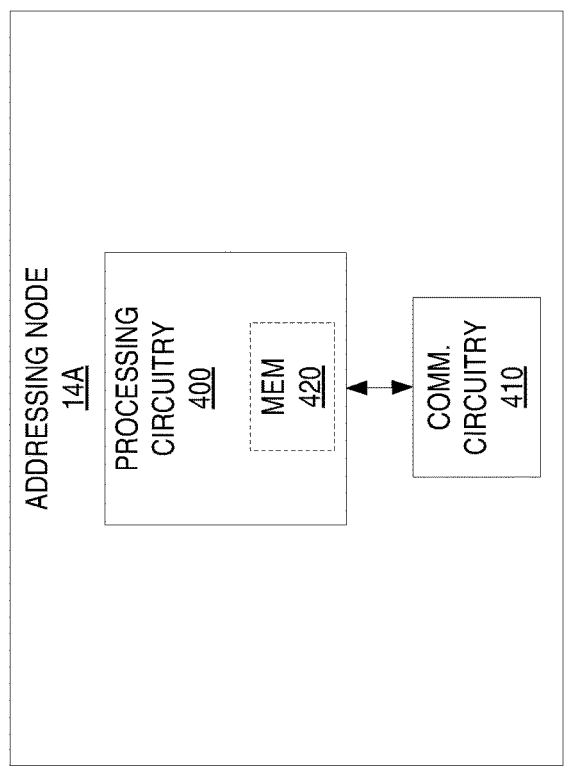

Regardless, FIG. 10 illustrates an addressing node 14A in accordance with one or more embodiments. As shown, the addressing node 14A includes processing circuitry 400 and communication circuitry 410. The communication circuitry 410 is configured to transmit and/or receive information to and/or from one or more other nodes, e.g., via any communication technology. The processing circuitry 400 is configured to perform processing described above, e.g., in FIG. 2, such as by executing instructions stored in memory 420. The processing circuitry 400 in this regard may implement certain functional means, units, or modules.

Figure 11:
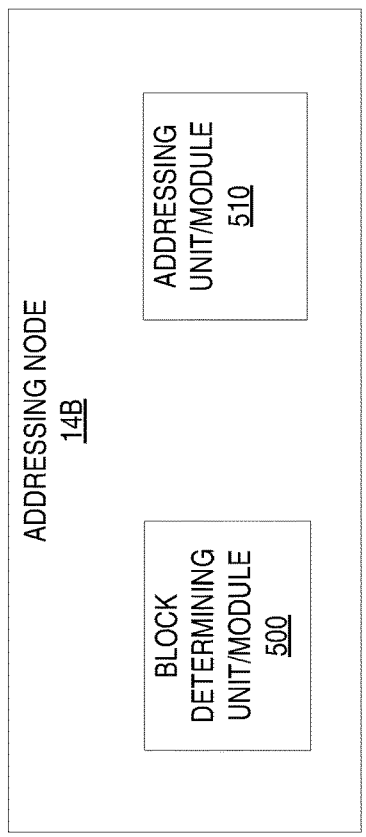
FIGS. 10-11 are block diagrams of different embodiments of an addressing node according to one or more embodiments.

FIG. 11 illustrates an addressing node 14B implemented in accordance with one or more other embodiments. As shown, the addressing node 14B implements various functional means, units, or modules, e.g., via the processing circuitry 400 in FIG. 10 and/or via software code. These functional means, units, or modules, e.g., for implementing the method in FIG. 2, include for instance a block determining module or unit 500 for determining multiple indoor blocks into which an indoor space is spatially divided. Also included is an addressing module or unit 510 for, for each of the indoor blocks, obtaining a set of features which describe characteristics of the indoor block and identifying the indoor block as being located at an address formed from the set of features.

Also an extracting node 16 may perform the method 200 in FIG. 6 and any other processing herein by implementing any functional means or units. In one embodiment, for example, the extracting node 16 comprises respective circuits or circuitry configured to perform the steps shown in FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein. In some embodiments, for example, the extracting node 16 may be an Evolved Serving Mobile Location Center (E-SMLC) in a Long Term Evolution (LTE) system.

Figure 12:
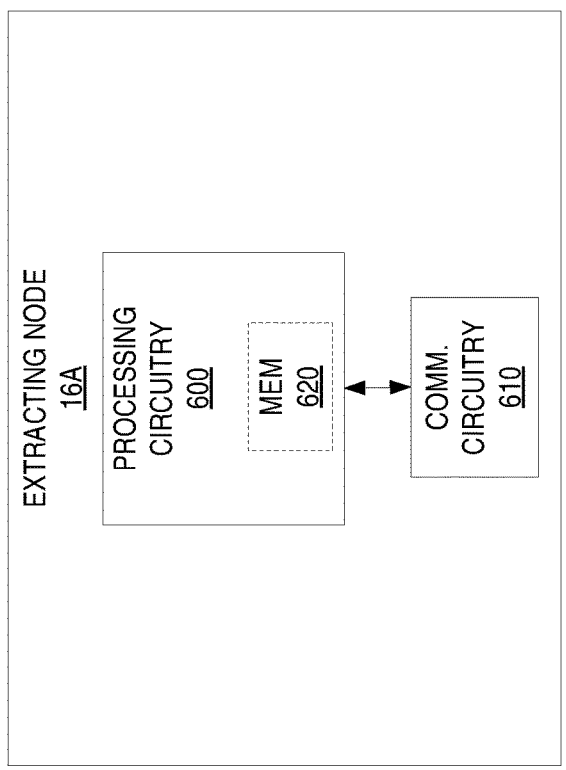

Regardless, FIG. 12 illustrates an extracting node 16A in accordance with one or more embodiments. As shown, the extracting node 16A includes processing circuitry 600 and communication circuitry 610. The communication circuitry 610 is configured to transmit and/or receive information to and/or from one or more other nodes, e.g., via any communication technology. The processing circuitry 600 is configured to perform processing described above, e.g., in FIG. 6, such as by executing instructions stored in memory 620. The processing circuitry 600 in this regard may implement certain functional means, units, or modules.

Figure 13:
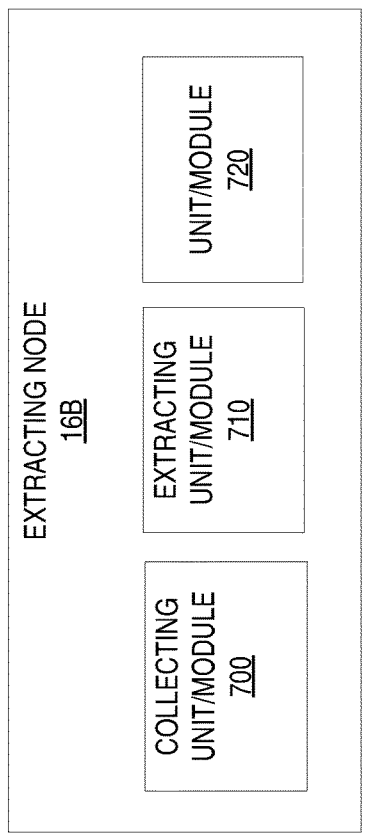
FIGS. 12-13 are block diagrams of different embodiments of an extracting node according to one or more embodiments.

FIG. 13 illustrates an extracting node 16B implemented in accordance with one or more other embodiments. As shown, the extracting node 16B implements various functional means, units, or modules, e.g., via the processing circuitry 600 in FIG. 12 and/or via software code. These functional means, units, or modules, e.g., for implementing the method in FIG. 6, include for instance a collecting module or unit 700 for collecting data that is obtained by one or more input devices with which a wireless device is equipped or that describes a trajectory with which the wireless device moves. Also included is an extracting unit or module 710 for extracting, from the collected data, a set of features which describes characteristics of a place at which the wireless device is located, at which the wireless device targets as a destination, or at which the wireless device targets to avoid. Further included is a module or unit 720 for performing, or assisting another node in performing, mapping, positioning, or navigation in the indoor space based on the extracted set of features.

Further, an indoor positioning or navigation node 800 may perform the method 300 in FIG. 8 and any other processing herein by implementing any functional means or units. In one embodiment, for example, the indoor positioning or navigation node 800 comprises respective circuits or circuitry configured to perform the steps shown in FIG. 8. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein. In some embodiments, for example, the indoor positioning or navigation node 800 may be an Evolved Serving Mobile Location Center (E-SMLC) in a Long Term Evolution (LTE) system.

Figure 14:
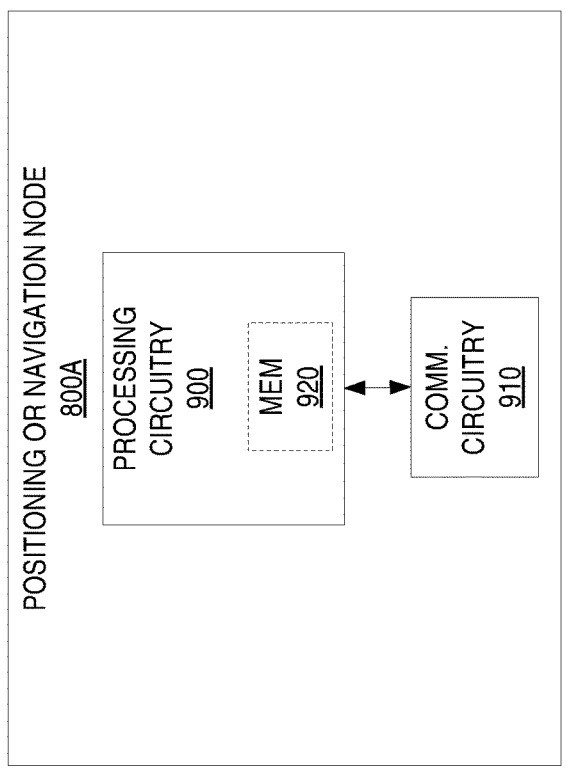

Regardless, FIG. 14 illustrates an indoor positioning or navigation node 800A in accordance with one or more embodiments. As shown, the indoor positioning or navigation node 800A includes processing circuitry 900 and communication circuitry 910. The communication circuitry 910 is configured to transmit and/or receive information to and/or from one or more other nodes, e.g., via any communication technology. The processing circuitry 900 is configured to perform processing described above, e.g., in FIG. 8, such as by executing instructions stored in memory 920. The processing circuitry 900 in this regard may implement certain functional means, units, or modules.

Figure 15:
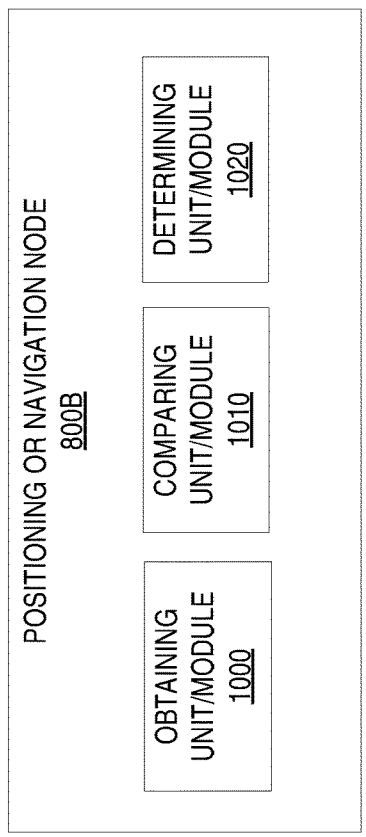
FIGS. 14-15 are block diagrams of different embodiments of an indoor positioning or navigation node according to one or more embodiments.

FIG. 15 illustrates an indoor positioning or navigation node 800B implemented in accordance with one or more other embodiments. As shown, the indoor positioning or navigation node 800B implements various functional means, units, or modules, e.g., via the processing circuitry 900 in FIG. 14 and/or via software code. These functional means, units, or modules, e.g., for implementing the method in FIG. 6, include for instance an obtaining module or unit 1000 for obtaining a set of features which describe characteristics of a place in an indoor space. Also included is a comparing unit or module 1010 for comparing the obtained set of features to addresses of respective indoor blocks into which the indoor space is spatially divided, wherein each indoor block is identified as being located at an address formed from a set of features which describe characteristics of the indoor block. Further included is a determining unit or module 1020 for determining, based on the comparing, which of the indoor blocks corresponds to the place in the indoor space.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a computing system, the method comprising:
   building a database of feature sets, each feature set being associated with, and describing characteristics of, a respective indoor location within an indoor space;
   generating an address for each of the indoor locations from the feature set associated with the indoor location in the database;
   searching the database using a user-specified feature set to identify an indoor location of potential interest to the user;
   identifying a further indoor location of potential interest to the user that has a same address as the identified indoor location;
   prompting the user to select between the identified indoor location of interest and the identified further indoor location of interest;
   labeling the selected indoor location on a map using a feature extracted from the generated address of the identified indoor location; and
   providing navigation instructions from a location of the user to the selected indoor location.

2. The method of claim 1, wherein providing the navigation instructions comprises providing a route that avoids an additional indoor location that is associated with the user-specified feature set.

3. The method of claim 1, wherein providing the navigation instructions comprises providing a route that includes an additional indoor location that is associated with the user-specified feature set.

4. The method of claim 1, wherein:
   building the database of feature sets and generating the addresses are performed by a first network node of the computing system; and
   searching the database and labeling the identified indoor location are performed by a second network node of the computing system.

5. The method of claim 4, wherein the second network node is an Evolved Serving Mobile Location Center.

6. The method of claim 4, wherein the second network node is a wireless device.

7. A computing system comprising:
   processing circuitry and memory circuitry, the memory circuitry containing instructions executable by the processing circuitry such that the computing system is configured to:
      build a database of feature sets, each feature set being associated with, and describing characteristics of, a respective indoor location within an indoor space;
      generate an address for each of the indoor locations from the feature set associated with the indoor location in the database;
      search the database using a user-specified feature set to identify an indoor location of potential interest to the user;
      identify a further indoor location of potential interest to the user that has a same address as the identified indoor location;
      prompt the user to select between the identified indoor location of interest and the identified further indoor location of interest;
      label the selected indoor location on a map using a feature extracted from the generated address of the identified indoor location; and
      provide navigation instructions from a location of the user to the selected indoor location.

8. The computing system of claim 7, wherein to provide the navigation instructions the computing system is configured to provide a route that avoids an additional indoor location that is associated with the user-specified feature set.

9. The computing system of claim 7, wherein to provide the navigation instructions the computing system is configured to provide a route that includes an additional indoor location that is associated with the user-specified feature set.

10. A computing system comprising:
a first network node configured to:
  build a database of feature sets, each feature set being associated with, and describing characteristics of, a respective indoor location within an indoor space; and
  generate an address for each of the indoor locations from the feature set associated with the indoor location in the database;
a second network node configured to:
  search the database using a user-specified feature set to identify an indoor location of potential interest to the user;
  identify a further indoor location of potential interest to the user that has a same address as the identified indoor location;
  prompt the user to select between the identified indoor location of interest and the identified further indoor location of interest;
  label the identified indoor location on a map using a feature extracted from the generated address of the identified indoor location; and
  provide navigation instructions from a location of the user to the indoor location.

11. The computing system of claim 10, wherein to provide the navigation instructions the second network node is configured to provide a route that avoids an additional indoor location that is associated with the user-specified feature set.

12. The computing system of claim 10, wherein to provide the navigation instructions the second network node is configured to provide a route that includes an additional indoor location that is associated with the user-specified feature set.

13. The computing system of claim 10, wherein the second network node is an Evolved Serving Mobile Location Center.

14. The computing system of claim 10, wherein the second network node is a wireless device.

15. A non-transitory computer readable medium storing instructions that, when run on processing circuitry of a programmable computing system, cause the programmable computing system to:
build a database of feature sets, each feature set being associated with, and describing characteristics of, a respective indoor location within an indoor space;
generate an address for each of the indoor locations from the feature set associated with the indoor location in the database;
search the database using a user-specified feature set to identify an indoor location of potential interest to the user;
identify a further indoor location of potential interest to the user that has a same address as the identified indoor location;
prompt the user to select between the identified indoor location of interest and the identified further indoor location of interest;
label the selected indoor location on a map using a feature extracted from the generated address of the identified indoor location; and
provide navigation instructions from a location of the user to the indoor location.

* * * * *

UNITED STATES PATENT AND TRADEMARK OFFICE
CERTIFICATE OF CORRECTION

PATENT NO. : 11,815,357 B2
APPLICATION NO. : 16/322353
DATED : November 14, 2023
INVENTOR(S) : Zu et al.

It is certified that error appears in the above-identified patent and that said Letters Patent is hereby corrected as shown below:

In the Specification

In Column 8, Line 20, delete "$V_{IB2}$" and insert -- $W_{IB2}$ --, therefor.

In Column 13, Line 62, delete "similarly" and insert -- similar --, therefor.

In Column 16, Line 1, delete "Location Platform (SLP)" and insert -- Service Location Protocol (SLP) --, therefor.

Signed and Sealed this
Twenty-ninth Day of October, 2024

Katherine Kelly Vidal
*Director of the United States Patent and Trademark Office*